(12) United States Patent
Wu et al.

(10) Patent No.: US 7,161,719 B2
(45) Date of Patent: Jan. 9, 2007

(54) GENERALIZED COLOR CALIBRATION ARCHITECTURE AND METHOD

(75) Inventors: Yifeng Wu, Vancouver, WA (US); David Kinkley, Vancouver, WA (US); Kevin R Hudson, Camas, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 879 days.

(21) Appl. No.: 09/964,167

(22) Filed: Sep. 26, 2001

(65) Prior Publication Data

US 2003/0058459 A1  Mar. 27, 2003

(51) Int. Cl.
*G03F 3/08* (2006.01)

(52) U.S. Cl. .................. 358/518; 358/1.9; 358/504; 358/406; 358/518; 358/3.23; 358/515; 358/1.18; 345/604; 347/19

(58) Field of Classification Search .............. 358/1.9, 358/504, 406, 518, 3.23, 501, 515, 1.18, 358/1.15; 345/604; 347/19
See application file for complete search history.

(56) References Cited

U.S. PATENT DOCUMENTS

| 5,172,224 | A | * | 12/1992 | Collette et al. ............ 358/515 |
| 5,508,826 | A | * | 4/1996 | Lloyd et al. ................ 358/501 |
| 5,537,516 | A | * | 7/1996 | Sherman et al. ............ 358/1.9 |
| 5,995,714 | A | * | 11/1999 | Hadley et al. .............. 358/1.9 |
| 6,048,117 | A | | 4/2000 | Banton |
| 6,178,007 | B1 | * | 1/2001 | Harrington ................. 358/1.9 |
| 6,331,042 | B1 | * | 12/2001 | Yamada ..................... 347/19 |
| 6,441,923 | B1 | * | 8/2002 | Balasubramanian et al. ..... 358/3.23 |
| 6,462,835 | B1 | * | 10/2002 | Loushin et al. ............. 358/1.9 |
| 6,606,167 | B1 | * | 8/2003 | Rees et al. ................. 358/1.9 |
| 6,829,058 | B1 | * | 12/2004 | Kumada .................... 358/1.15 |
| 6,965,462 | B1 | * | 11/2005 | Henderson et al. ......... 358/504 |
| 7,054,034 | B1 | * | 5/2006 | Underwood et al. ........ 358/1.9 |
| 2001/0038459 | A1 | * | 11/2001 | Mahy ....................... 358/1.9 |
| 2004/0160641 | A1 | * | 8/2004 | Kohler et al. .............. 358/1.18 |
| 2005/0094170 | A1 | * | 5/2005 | Ichitani .................... 358/1.9 |

OTHER PUBLICATIONS

British Search Report dated Mar. 3, 2003.

* cited by examiner

*Primary Examiner*—Kimberly Williams
*Assistant Examiner*—Beniyam Menberu

(57) ABSTRACT

A generalized color calibration architecture and method are disclosed. A first interface receives raw measuring data of a sample from a measuring tool. The data has a color type, and the sample has one or more color targets. Each color target has an arrangement of one or more color patches. A second interface receives the color data type, one or more target identifiers specifying the targets, and a color patch order for each target identifier. The color patch order specifies the arrangement of the color patches of a corresponding color target. A color calibration manager performs the color calibration based on the raw measuring data, the color data type, the target identifiers, and the color patch order for each target identifier. The calibration yields or updates one or more color conversion tables for subsequent use with a device, such as a color printer, or another type of device.

6 Claims, 7 Drawing Sheets

FIG 2
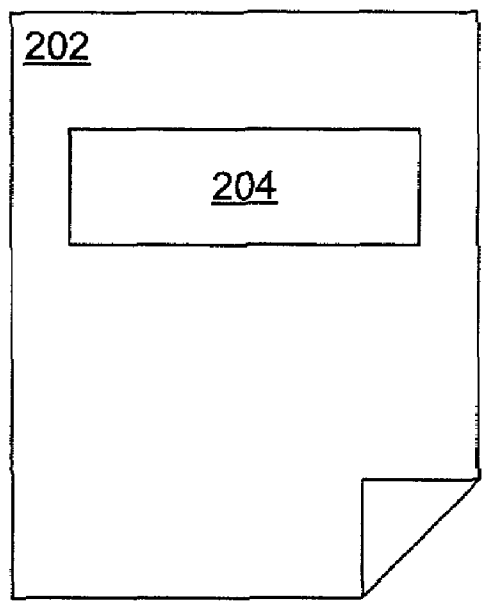
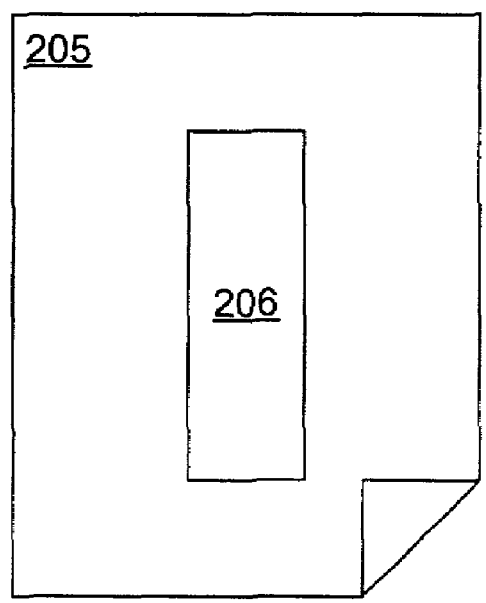

FIG 5
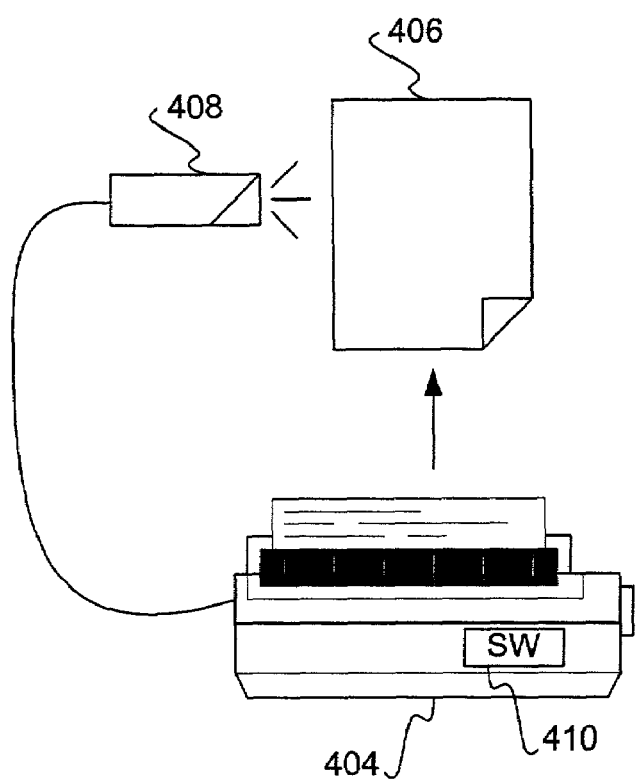

GENERALIZED COLOR CALIBRATION ARCHITECTURE AND METHOD

FIELD OF THE INVENTION

This invention relates generally to color output devices, such as color printers, and more particularly to color calibration for such devices.

BACKGROUND OF THE INVENTION

Color printers have become exceedingly popular. Previously, such printers were mainly used only for professional purposes, since their cost could run into the thousands of dollars. Professional artists and entities concerned with printing color images and documents on various types of media had at their disposal high-end printers that could generate very life-like color prints. More recently, however, the cost of color printers, including laser printers but more usually inkjet printers, has plummeted, resulting in their purchase by home users and other non-professionals. With the advent of applications like digital photography, such low-cost color printers are increasingly being used to print color prints of photos, computer-drawn images, and other types of documents.

Regardless of the type of color printer, color calibration is an important process for color printers and other types of devices. Color calibration maintains color consistency from specific printer to specific printer, from print job to print job, from one day to the next, and so on. Calibration is especially important when maintaining critical colors, such as colors in company logos, production of multiple prints in a single print job, production of various jobs, and so on. Modern color printers can produce excellent color output, but colors tend to drift over time, causing consistency and other problems for users.

There are generally four reasons why color calibration should be performed. First, as much as a 10–20% variation can exist in the ink drop size between otherwise identical printers, and otherwise identical ink cartridges, due to manufacturing variations. Second, variation can also exist in the composition of different ink produced at different times. The third and fourth reasons are environmental factors, including temperature and humidity, which can vary at different times when the printer is used.

A color calibration module can contain a test target of a number of color patches that range from 0 to 100% ink coverage for each ink color the printer uses. The purpose of this test target is to allow users to evaluate ink coverage. After printing the calibration target, users typically read the target with a device that generates optical density or other types of values, which are entered into the calibration module to determine the adjustment necessary to provide for consistent colors. Optical density values in particular provide a numeric value that correlates to ink film thickness, where high optical density values relate to heavier ink coverage, and lower optical density values relate to lighter ink coverage. Devices that can measure such optical density and other values include densitometers, calorimeters, spectrophotometers, and other types of devices. A common type of color calibration approach is referred to as linearization, in which a straight-line relationship between color input and color output is determined.

A difficulty with existing color calibration modules is that they tend to be tied to specific measurement devices, output devices, test targets, color calibration approaches, such as linearization, and so on. However, quality and cost requirements differ based on different user's needs. For example, high-end users likely want the highest quality possible, and are willing to waste media and ink, expend the time necessary to achieve accurate color calibration, and buy specialized measuring tools, to ensure that color consistency is maintained as accurately as possible. Conversely, low-end users likely want only a given degree of color consistency, to minimize waste of media and ink, to expend a minimal amount of time for color calibration, and do not wish to buy specialized equipment. Current color calibration modules cannot accommodate this difference in needs.

Furthermore, existing color calibration modules typically are geared to only a given color calibration approach, such as only linearization. However, different users may have different requirements, and may want to use a number of different calibration approaches at different times, and so on. Different users also likely will want to generally use different calibration approaches, which existing color calibration modules cannot accommodate. For these and other reasons, therefore, there is a need for the present invention.

SUMMARY OF THE INVENTION

The invention relates to a generalized architecture and method for color calibration. A first interface receives raw measuring data of a sample from a measuring tool. The data has a color type, and the sample has one or more color targets on which basis color calibration of a device is to be performed. Each color target has an arrangement of one or more color patches. A second interface receives a color calibration approach, the color data type, one or more target identifiers specifying the one or more targets, and a color patch order for each target identifier. The color patch order specifies the arrangement of the one or more color patches of a corresponding color target. A color calibration manager performs the color calibration based on the raw measuring data, the color data type, the one or more target identifiers, and the color patch order for each target identifier, according to the color calibration approach, such as linearization, neutral axis, and so on, specified. The color calibration yields or updates one or more color conversion tables for subsequent use with the device. Still other embodiments and aspects of the invention will become apparent by reading the detailed description that follows, and by referring to the drawings.

BRIEF DESCRIPTION OF THE DRAWINGS

FIG. 2 is a diagram of example color targets and their color patch(es) output on a media, according to an embodiment of the invention.

FIG. 5 is a diagram of a system in which the color calibration software module of FIG. 3 resides within a printer of the system and the measuring tool is external or off-line, according to an embodiment of the invention.

DETAILED DESCRIPTION OF THE INVENTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Color Calibration Method

Figure 1:
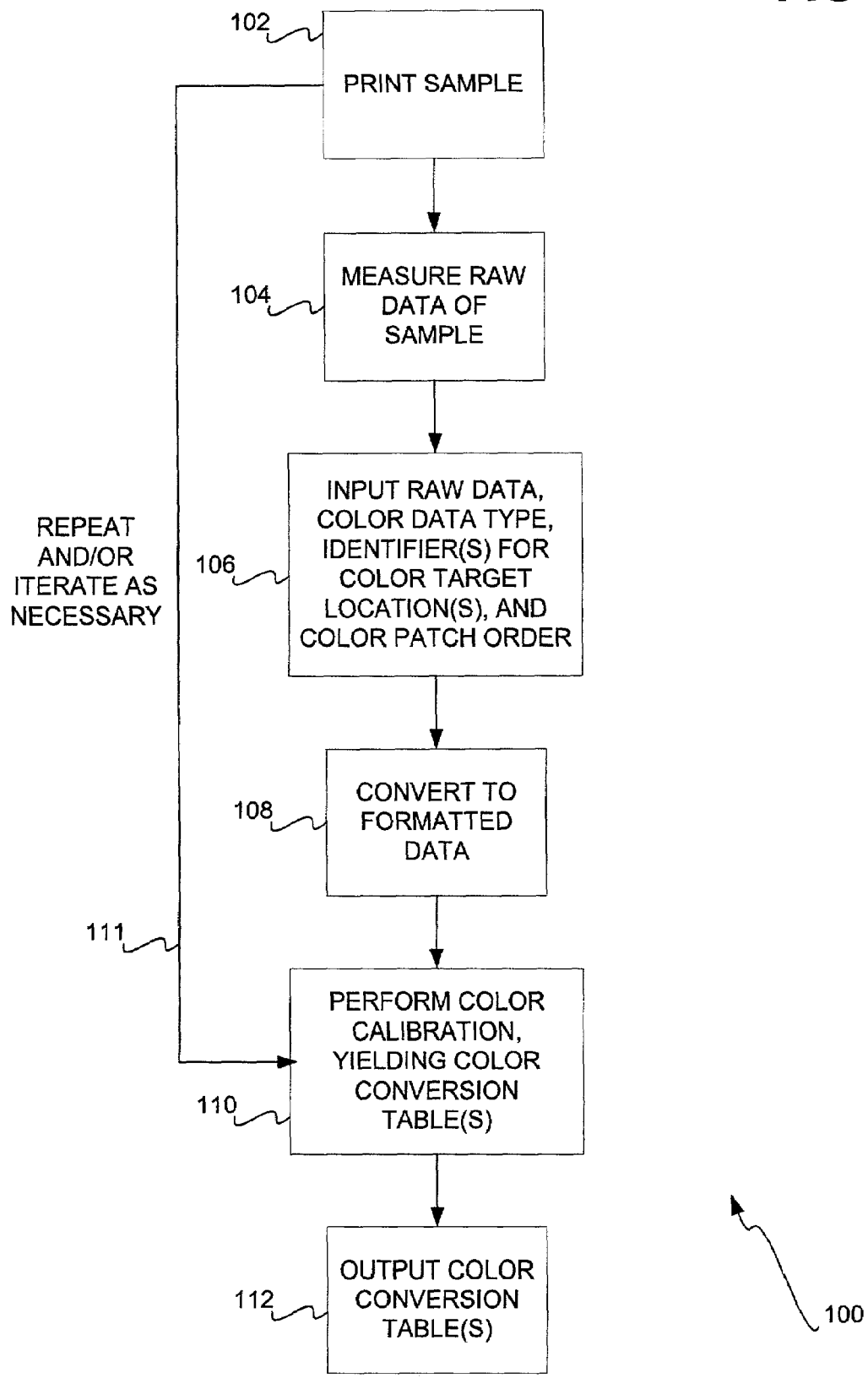
FIG. 1 is a flowchart of a color calibration method according to an embodiment of the invention.

FIG. 1 shows a method 100 according to an embodiment of the invention. At least some parts of the method 100 may be performed by execution of a computer program by a processor of a computerized device. The computer program may be stored on a computer-readable medium, such as a removable or permanent storage medium like a floppy disk or a hard disk drive, or a volatile or non-volatile memory, such as embedded printer firmware. The functionality of each step or act of the method 100 may be performed by corresponding and/or respective means of the computer program. The computerized device may be a computer, the device to be color calibrated, such as a printer, as well as another type of device.

A sample is first printed by a printer to be color calibrated, or otherwise generated by the device to be color calibrated (102). The sample has one or more color targets, on which basis color calibration of the printer is to be performed. Each color target has an arrangement of one or more color patches. FIG. 2 shows example samples 202 and 205. The sample 202 is printed on a media, and includes a color target 204, whereas the sample 205 is also printed on a media, and includes a color target 206. Each of the color targets 204 and 206 may have tens or hundreds of color patches. Typically, the sample 202 would be printed first, and color calibration performed based thereon, and then the sample 205 would be printed, and further color calibration would be performed based thereon, to render more accurate the color calibration of the device to be color calibrated. That is, the method 100 is repeated for each color target typically. Whereas in FIG. 2 the color targets 204 and 206 are shown as being printed on separate media, they may also be printed on the same media, but at different times.

The color targets can vary according to the type of color calibration that is to be performed. For linearization color calibration, the color target may have a number of different color patches that range from 0 to 100% ink coverage for each ink color that a given printer or other device uses. For example, a four-color printer may have sixty-eight total patches, with seventeen patches of each color.

As another example, a color target may include color patches having colors near the neutral axis for neutral axis color calibration. The neutral axis refers to a line drawn between a black origin at the origin point within a red, green, blue (RGB) color cube of space, where each of the values for red, green, and blue is zero, and a white maximum at the point where each of the values for red, green, and blue is at a maximum value. All the points on this line are gray, where the closer the points are to the origin, the darker the gray, and the closer they are to the maximum, the lighter they are. This diagonal line is thus referred to as the neutral axis, where colors have no hue, and contain equal quantities of red, green, and blue.

Furthermore, a color target may include color patches in skin tone areas, for accurate reproduction of skin tone. A color target may include color patches near nature scenes, such as blue sky, green grass, and so on, for color calibration of nature scene colors. Other types of color calibration approaches can also be employed.

Referring back to FIG. 1, the method 100 next measures raw data of the sample (104). A desired measuring tool measures the raw data of the sample. The measuring tool may be a sensor embedded in the printer, measuring the sample substantially concurrent with printing of the sample by the printer. The measuring tool may also be an external tool that measures the sample after the printer has printed it. Types of measuring tools include densitometers, calorimeters, and spectrophotometers. For example, a densitometer measures the numeric value that correlates to ink film thickness, where high optical density values indicate heavier ink coverage, and lower optical density values indicate lighter ink coverage. These optical density values are the raw data of the sample measured by the densitometer. Other types of raw data include spectrum data from a spectrophotometer, and colorimetric data from a calorimeter.

There are a number of different color types as well. The color type may be CMYK, in conjunction with a printer having cyan, magenta, yellow, and black ink colors. Other color types include RGB, for red, green, and blue colors, and HSB, for hue, saturation, and brightness, among others. A colorimeter measures the red, green, and blue values of the sample, for instance, whereas a densitometer measures the relative strength of a color. Two other color types, CIEXYZ and CIELAB, are defined by a color standard organization known as the Commission Internationale de l'Eclairage.

Each color target has a specific input color type, on which basis the device outputs the color target. Measuring with the measuring tool results in raw data of another color type. For instance, densitometers yield optical density values, colorimeters yield RGB values, and spectrophotometers yield spectrum values. Finally, there is a color type that is desired, such as luminance, CIEXYZ or CIELAB, for actually performing the color calibration. One or more of these different color types, the input color type, the measuring tool color type, and the desired color type, can be encompassed under the term color type or color data type as is used herein.

The raw data measured by the measuring tool, along with the color data type, target identifiers to specify the color targets, and a color patch order to specify the arrangement of the color patches of a corresponding color target, are then input (106). Also input is the color calibration approach desired to be used, such as linearization, neutral axis, and so on. The raw data may be directly input from the measuring tool through a measuring tool interface. Conversely, the color calibration approach, the color data type, the target identifiers, and the color patch orders for the color targets may be manually input by a user through a user interface.

For example, in FIG. 2, there would be a target identifier to specify each of the color targets 204 and 206. The target identifiers may be a simple ordering, such as one, two, and so on, of the color targets, to distinguish them from one another, as an example, and to indicate that the raw data first reflects the color target having the first identifier, then reflects the color target having the second identifier, and so on. The raw measuring data, the color data type, the target identifiers, and the color patch order for each target identifier may then optionally be converted to a particular data format as desired, to yield formatted data (108). This conversion can also convert the raw measuring data from the color type of the measuring tool to the desired color type.

Color calibration is performed for the device based on the raw measuring data, the color data type, the target identifiers, and the color patch order for each target identifier, as may have been converted to formatted data, according to the desired color calibration approach (110). The color calibration compares the raw measured data for each color patch of each color target with the ideal or desired data for each color patch of each color target. One or more color conversion tables are generated that map the former to the latter, so that subsequent output on the device yields the desired color as the actual color. If there are existing color conversion tables, then such tables are updated to achieve more consistent colors.

For example, the desired optical density value of a given yellow color patch may be 85%, whereas the measured value of the patch may be only 80%. In a linearization color calibration, a printer may thus be calibrated so that when a yellow optical density value of 85% is specified, the printer actually outputs more yellow ink, so that the actual measured yellow optical density value will in fact be 85%, and not 80% as occurred prior to calibration. Color calibration can occur by calling one or more color calibration calls from a color calibration call library of such calls. For instance, there may be a specific call in the library for linearization, another call for neutral axis calibration, and so on.

Once color calibration for one of the targets is completed, the method 100 repeats and/or iterates as necessary, as indicated by the line 111. That is, the method 100 repeats and/or iterates for printing each additional color target, of each additional sample. This occurs for cascading or sequential color calibration. For example, linearization may first be performed as an initial color calibration approach, and then neutral axis may be performed to further make the results of the color calibration more accurate. The color conversion tables generated or modified as a result of the calibration are ultimately output (112), for subsequent use by the device being calibrated.

The method 100 of FIG. 1 allows for flexibility in the color calibration process. Color measurement data can be taken from printed targets by different types of devices. Different numbers of color channels can be specified. Different color targets that include different color patches can be specified. The same color patches in a target may be arranged in different ways geometrically when read by different devices. Furthermore, there may exist a change in the color type, from optical density to luminance, RGB to CIEXYZ or CIELAB, and so on, where the user specifies the color type of the output of the measuring tool. The printed target size can be adjusted for economy of time and ink, or for color accuracy, where a larger target enables higher color accuracy. Multi-stage color calibration can also be performed, where various calibration stages can be cascaded and thus performed in a serial manner. In other words, the color calibration process becomes completely configurable as desired and/or as needed.

Color Calibration Software Module

Figure 3:
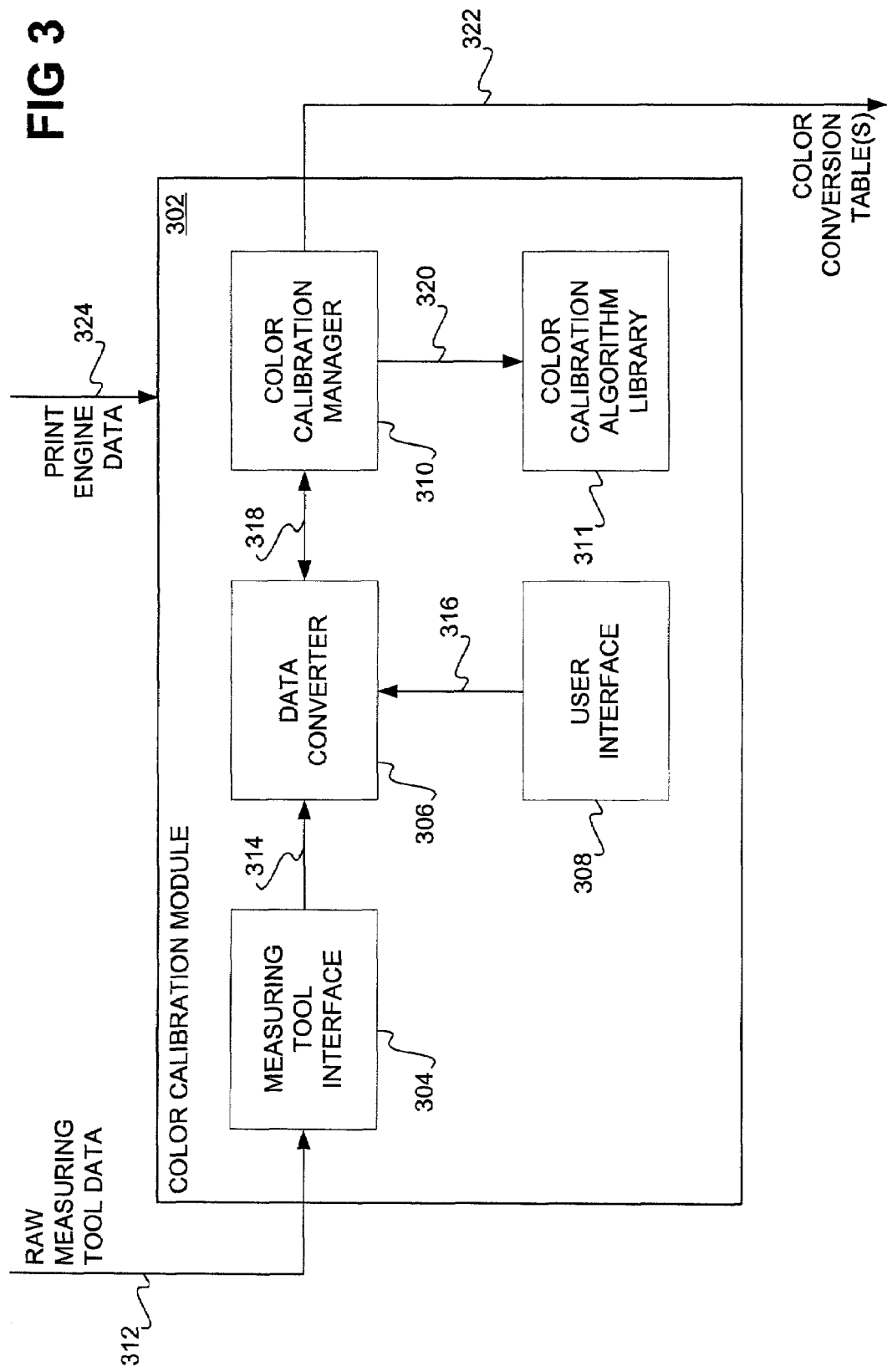
FIG. 3 is a diagram of a color calibration software module according to an embodiment of the invention.

FIG. 3 shows a color calibration software module 302 that can implement the configurable and flexible color calibration of an embodiment of the invention. For example, the module 302 may perform the method 100 of FIG. 1 that has been described. The module 302 may be implemented within a computer, a device to be color calibrated, such as a printer, or another device. The module 302 includes a measuring tool interface 304, a data converter 306, a user interface 308, a color calibration manager 310, and a color calibration algorithm library 311.

The measuring tool interface 304 receives the raw measuring data of a sample from a measuring tool, as indicated by the arrow 312. As has been indicated, the sample has a color data type, and the raw measuring data may differ depending on the type of measuring tool used. The raw measuring data specifically reflects one or more color targets of the sample, and on which basis the color calibration of a device is to be performed, where each color target has an arrangement of one or more color patches. The raw measuring data is passed by the measuring tool interface 304 to the data converter 306, as indicated by the arrow 314.

The data converter 306 also receives information from the user interface 308, as indicated by the arrow 316. The user interface 308 is generally an interface, such as a user interface, by which the color calibration software module 302 receives specification of the color targets of the sample, and the color patch order specifying the arrangement of the color patches of each color target. For instance, target identifiers are input to specify the color targets. The user typically manually enters in these identifiers, as well as the color patch order, into the module 302 via the interface 308. The user interface 308 also receives the desired color calibration approach. The user interface 308 can be a graphical user interface.

Optionally, data may also be received from the print engine, or from another component of the device to be color calibrated, as indicated by the arrow 324. This information may indicate whether there exists an embedded sensor, in which instance the raw measuring data can be received by the measuring tool interface 304 from the print engine. The information may also indicate the color type of the print engine, how many color elements the engine has, and other information that may be used during color calibration.

Finally, the data converter 306 can receive information on the device for which color calibration is to be performed from the color calibration manager 310, as indicated by the bi-directional arrow 318. Based on this information from the color calibration manager 310, for instance, the data converter 306 converts the data received from measuring tool interface 304 and the user interface 308 to formatted data. The formatted data is in a format understood by the color calibration manager 310. The data converter 306 passes the formatted data to the color calibration manager 310, as indicated by the bi-directional arrow 318. The data converter 306 can also convert the data received from the measuring tool interface 304 from one color type to another color type.

The color calibration manager 310 performs the color calibration based on the raw measuring data, the color data type, the target identifiers, and the color patch orders for the identifiers, as this information has been provided to it by the data converter 306 in a formatted manner, according to the desired color calibration approach. The color calibration manager 310 preferably calls one or more color calibration algorithms, from the color calibration algorithm library 311, as indicated by the arrow 320. Each algorithm may be specific to a type of color calibration, such as linearization calibration, neutral axis calibration, and so on. The end result of the color calibration performed by the manager 310 is one or more color conversion tables, either new tables, or modified or updated existing tables, as indicated by the arrow 322. These tables are used with the device that has been color calibrated for subsequent output by the device, such as by subsequent printing by a color printer.

Example Computer and Printer

Figure 4:
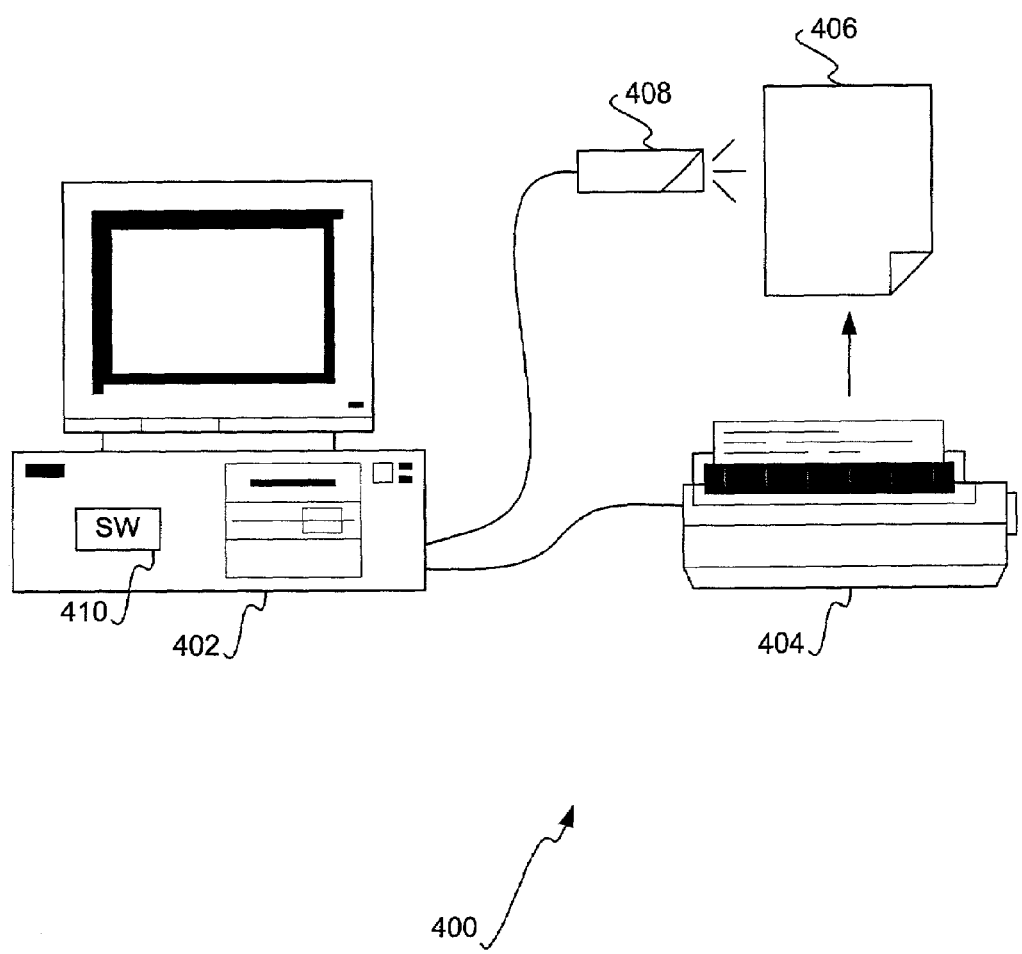
FIG. 4 is a diagram of a system in which the color calibration software module of FIG. 3 resides within a computer of the system and the measuring tool is external or off-line, according to an embodiment of the invention.

FIG. 4 shows a system 400 in which the color calibration software module 302 of FIG. 3 is implemented within a computer 402 as a software module 410, whereas FIG. 5 shows a system 500 in which the color calibration software module 302 of FIG. 3 is implemented within a printer 404, also as the software module 410. However, in each of FIGS. 4 and 5, a measuring tool 408 is an external or off-line measuring tool. In FIG. 4 specifically, the printer 404 generates a sample 406 having the color targets and their associated color patches. The measuring tool 408 is communicatively coupled to the computer 402, in which the software module 302 of FIG. 3 is implemented. By comparison, in FIG. 5, the printer 404 still generates the sample 406, the measuring tool 408 is communicatively coupled to the printer 404.

Figure 6:
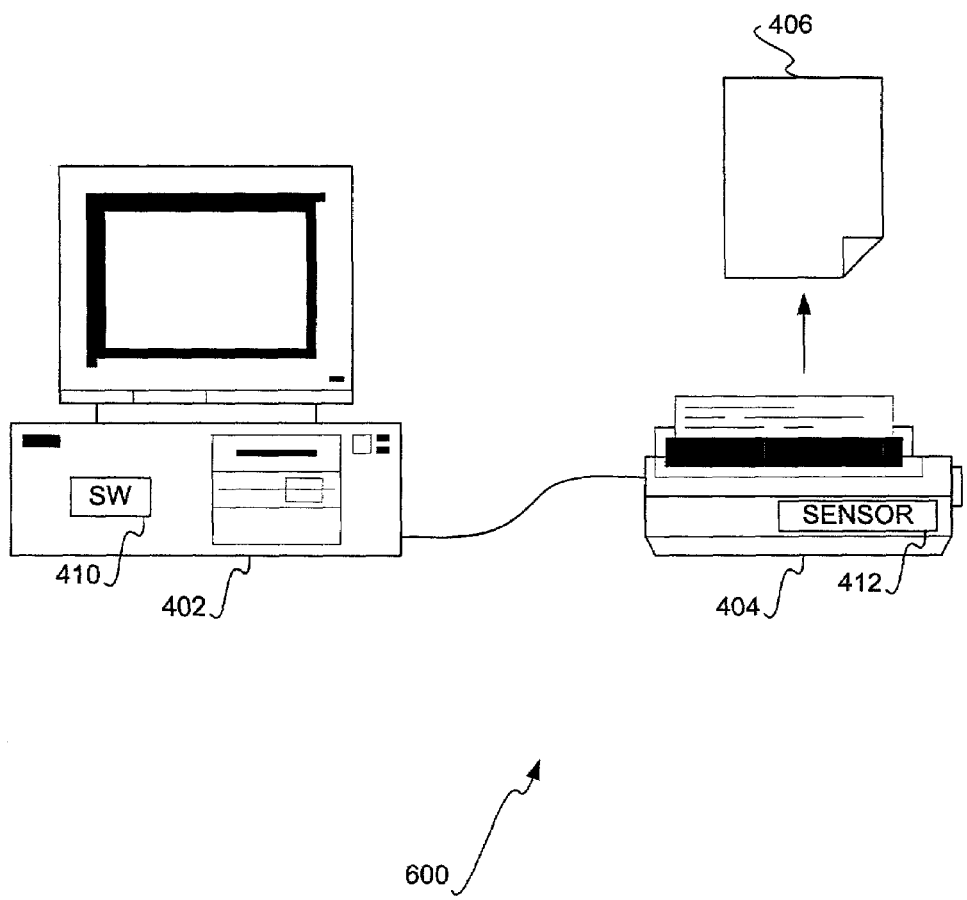
FIG. 6 is a diagram of a system in which the color calibration software module of FIG. 3 resides within a computer of the system and the measuring tool is a sensor embedded in a printer of the system, according to an embodiment of the invention.
Figure 7:
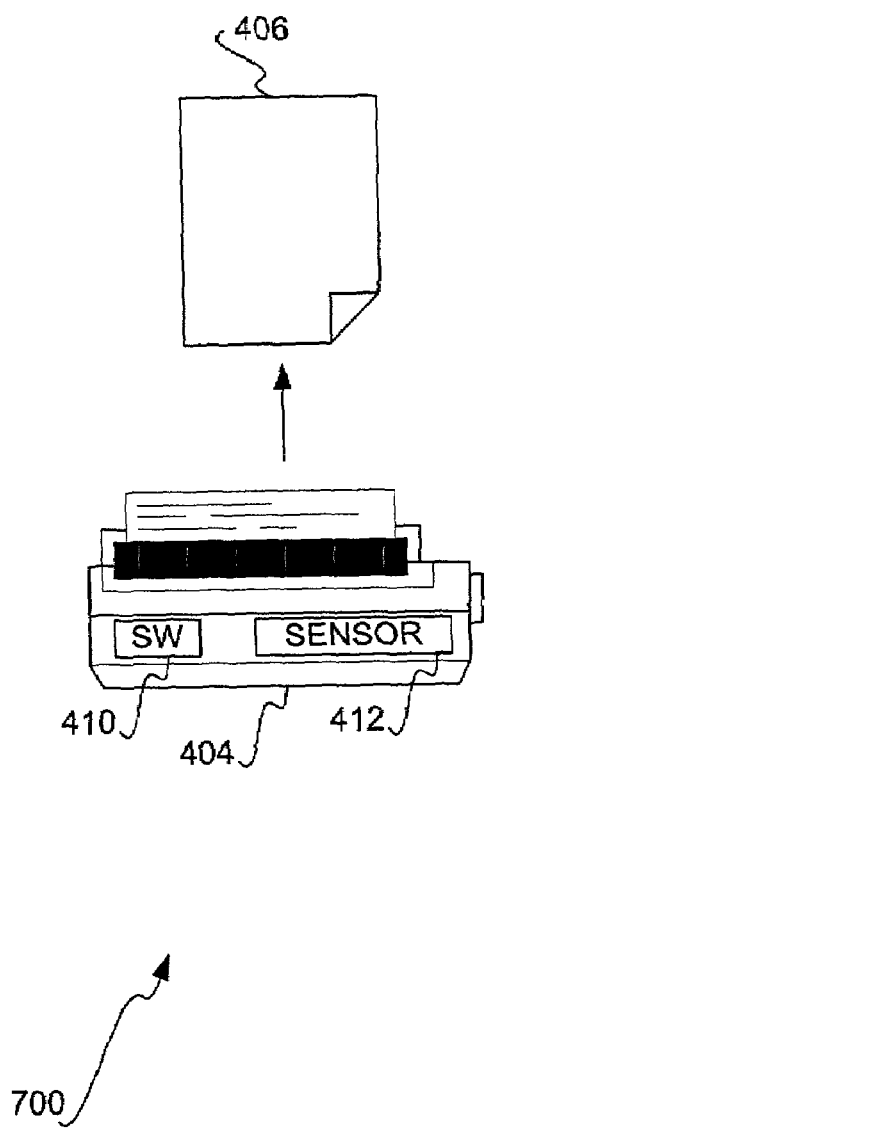
FIG. 7 is a diagram of a system in which the color calibration software module of FIG. 3 resides within a printer of the system and the measuring tool is a sensor embedded in the printer, according to an embodiment of the invention.

Furthermore, FIG. 6 shows a system 600 in which the color calibration software module 302 of FIG. 3 is implemented within the computer 402 as the software module 410, whereas FIG. 7 shows a system 700 in which the color calibration software module 302 of FIG. 3 is implemented within the printer 404, also as the software module 410. However, in each of FIGS. 6 and 7, a sensor 412 embedded in the printer 404 substitutes for the external measuring tool 408 of FIGS. 4 and 5. In FIG. 6 specifically, the printer 404 generates the sample 406 having the color targets and their associated color patches. The sensor 412 is embedded within the printer 404, but the software module 302 of FIG. 3 is implemented in the computer 402 as the module 410. By comparison, in FIG. 7, the printer 404 still generates the sample 406, and still has embedded therewithin the sensor 412, but the software module 302 of FIG. 3 is implemented within the printer 404 as the module 410.

CONCLUSION

Embodiments of the invention provide for advantages not found within the prior art. Whereas existing color calibration devices may use fixed measurement tools to measure fixed color targets and perform only one type of relatively simplistic color calibration, the method and module of the invention allow for flexibility and configurability in performing color calibration. Color calibration tasks are handled flexibly and in a unified manner at different levels. Different color calibration algorithms can be used, and input measuring data can be handled with different degrees of precision and in different formats. For example, if a given color printer only has a relatively inaccurate embedded densitometer, but a user has a more accurate external spectrophotometer, the user may use the same color calibration module to handle the data provided by the spectrophotometer, thus obtaining more accurate color conversion tables. As a result of its flexibility and configurability, the method and module can also accommodate multi-stage color calibration, allowing for cascading of several calibration stages to enable high-accuracy color calibration, and thus significantly reduce color reproduction error.

It is noted that, although specific embodiments have been illustrated and described herein, it will be appreciated by those of ordinary skill in the art that any arrangement is calculated to achieve the same purpose may be substituted for the specific embodiments shown. Other applications and uses of embodiments of the invention, besides those described herein, are amenable to at least some embodiments. As an example, whereas the invention has been substantially described in relation to color calibration of a printer, it is also applicable to color calibration of other devices, such as monitors and other types of displays. This application is intended to cover any adaptations or variations of the present invention. Therefore, it is manifestly intended that this invention be limited only by the claims and equivalents thereof.

We claim:

1. A generalized color calibration architecture comprising:
   a first interface to receive raw measuring data of a sample from a measuring tool, the data having a color data type, the sample having one or more color targets on which basis color calibration of a device is to be performed, each color target having an arrangement of one or more color patches;
   a second interface to receive a color calibration approach input by a user as a desired one of a number of different color calibration approaches, the color data type, one or more target identifiers specifying the one or more color targets, and a color patch order for each target identifier specifying the arrangement of the one or more color patches of a corresponding one of the one or more color targets;
   a color calibration manager to perform the calibration based on the raw measuring data, the color data type, the one or more target identifiers, and the color patch order for each target identifier, according to the color calibration approach, the calibration one of yielding and updating one or more color conversion tables for subsequent use with the device; and
   a color calibration algorithm library having one or more color calibration algorithms for calling by the color calibration manager to one of generate and update the one or more color conversion tables, the one or more calibration algorithms comprising a linearization color calibration algorithm and a neutral-axis color calibration algorithm.

2. The architecture of claim 1, further comprising a data converter to convert the raw measuring data, the color data type, the one or more target identifiers, and the color patch order for each target identifier to formatted data for input to the color calibration manager.

3. The architecture of claim 1, wherein the measuring tool comprises one of: an embedded device sensor, a densitometer, a colorimeter, and a spectrophotometer.

4. The architecture of claim 1, wherein the second interface comprises a user interface.

5. The architecture of claim 4, wherein the user interface comprises a graphical user interface.

6. The architecture of claim 1, wherein the color data type comprises one of: a luminance data type, a CIEXYZ data type, a CIELAB data type, and a spectrum data type.

* * * * *

UNITED STATES PATENT AND TRADEMARK OFFICE
CERTIFICATE OF CORRECTION

PATENT NO.       : 7,161,719 B2                                         Page 1 of 1
APPLICATION NO.  : 09/964167
DATED            : January 9, 2007
INVENTOR(S)      : Yifeng Wu et al.

It is certified that error appears in the above-identified patent and that said Letters Patent is hereby corrected as shown below:

In column 1, line 59, delete "calorimeters," and insert -- colorimeters, --, therefor.

In column 4, lines 25-26, delete "calorimeters," and insert -- colorimeters, --, therefor.

In column 4, line 33, delete "calorimeter" and insert -- colorimeter --, therefor.

In column 8, line 45, in Claim 1, insert -- color -- before "calibration".

Signed and Sealed this

Eleventh Day of November, 2008

JON W. DUDAS
*Director of the United States Patent and Trademark Office*